United States Patent [19]
Hubbell

[11] Patent Number: 5,872,179
[45] Date of Patent: Feb. 16, 1999

[54] TIRE WITH SILICA REINFORCED TREAD

[75] Inventor: Joseph Kevin Hubbell, Akron, Ohio

[73] Assignee: The Goodyear Tire & Rubber Company, Akron, Ohio

[21] Appl. No.: 884,490

[22] Filed: Jun. 27, 1997

Related U.S. Application Data

[63] Continuation of Ser. No. 475,731, Jun. 7, 1995, abandoned.

[51] Int. Cl.[6] .................................................. C08L 27/00

[52] U.S. Cl. ........................... 524/526; 525/232; 152/450

[58] Field of Search ........................... 525/232; 524/526; 152/450

[56] References Cited

U.S. PATENT DOCUMENTS

| | | | |
|---|---|---|---|
| 4,224,197 | 9/1980 | Ueda et al. | 260/5 |
| 4,522,970 | 6/1985 | Scriver et al. | 524/447 |
| 5,159,020 | 10/1992 | Halasa et al. | 525/237 |
| 5,162,409 | 11/1992 | Mroczkowski | 524/262 |

*Primary Examiner*—Peter D. Mulcahy
*Attorney, Agent, or Firm*—Henry C. Young, Jr.

[57] ABSTRACT

The invention relates to a tire with a tread which is quantitatively reinforced with silica where the tread is composed of three basic elastomers, namely, solution polymerization prepared styrene/butadiene rubber, cis 1,4-polybutadiene rubber and high vinyl polybutadiene rubber. Optionally the basic elastomer composition can also contain a minor amount of cis 1,4-polyisoprene natural rubber.

17 Claims, No Drawings

TIRE WITH SILICA REINFORCED TREAD

This is a continuation of application Ser. No. 08/475,731, filed on Jun. 7, 1995, now abandoned.

FIELD

This invention relates to a tire having a rubber tread which is quantitatively reinforced with silica. In one aspect, the tread is comprised of a basic three elastomers reinforced with a quantitative amount of silica or a combination of silica and carbon black. In one aspect, the tread rubber is required to be composed of a basic three elastomers composed of solution polymerization prepared styrene/butadiene copolymer rubber, cis 1,4-polybutadiene rubber and high vinyl polybutadiene rubber. Optionally, the basis elastomer composition can contain a minor amount of cis 1,4-polyisoprene natural rubber.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica is also sometimes used for such purpose, particularly when the silica is used in conjunction with a coupling agent. In some cases, a combination of silica and carbon black is utilized for reinforcing fillers for various rubber products, including treads for tires.

Various rubber compositions have been prepared for various purposes, some of which have included tire treads, which contain a polybutadiene containing a degree of 1,2-configuration, sometimes referred to as vinyl content. Representative of such various compositions include those, for example, taught in various patent specifications such as U.S. Pat. No. 3,937,681 relating to a tire tread of polybutadiene containing twenty-five to fifty percent of its monomer units in a 1,2-position. British Patent No. 1,166,832 relates to a tire tread of "high vinyl" butadiene rubber containing at least fifty percent of its monomer units in a 1,2-position. U.S. Pat. No. 4,192,366 relates to a composition of "medium vinyl" polybutadiene and blends thereof with natural rubber where such composition is required to contain a certain carbon black. U.S. Pat. No. 3,978,165 relates to a composition, taught to be useful for tire treads composed of (a) "medium vinyl" polybutadiene, (b) polybutadiene and (c) butadiene/styrene rubbers. German DE No. 2936-72 relates to mixtures of polybutadiene containing 35–70 percent of 1,2- units mixed with polyisoprene rubber and, optionally, with cis polybutadiene or styrene/butadiene rubber for tires. U.S. Pat. Nos. 3,827,991, 4,220,564 and 4,224,197 relate to combinations of polybutadiene containing at least seventy percent of 1,2-configuration with various other rubbers. U.S. Pat. No. 4,192,366 relates to a tire with tread of a blend of cis-polyisoprene rubber and a medium vinyl polybutadiene rubber cured with an excess of sulfur. U.S. Pat. No. 4,530,959 relates to a tire with tread composed of medium vinyl polybutadiene, cis 1,4-polyisoprene rubber and styrene/butadiene copolymer rubber in which the medium vinyl polybutadiene rubber can be prepared by polymerizing butadiene in the presence of a polar modifier and divinyl benzene in accordance with the teachings of U.S. Pat. No. 4,230,841.

It is important to appreciate that, conventionally, carbon black is considered to be a more effective reinforcing filler for rubber tire treads than silica if the silica is used without a coupling agent.

Indeed, at least as compared to carbon black, there tends to be a lack of, or at least an insufficient degree of, physical and/or chemical bonding between the silica particles and the rubber elastomers to enable the silica to become a reinforcing filler for the rubber for most purposes, including tire treads, if the silica is used without a coupler. While various treatments and procedures have been devised to overcome such deficiencies, compounds capable of reacting with both the silica surface and the rubber elastomer molecule, generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber, such as for example, silane coupling agents containing a polysulfide component, or structure, such as bis-(3-triethoxysilylpropyl)tetrasulfide (e.g. U.S. Pat. No. 3,873,489).

For silica reinforced tire treads, U.S. Pat. No. 4,519,430 discloses a silica rich tire tread which contains solution or emulsion SBR, optionally with polybutadiene rubber and/or polyisoprene rubber together with a mixture of silica and carbon black, with silica being required to be a major component of the silica/carbon black reinforcing filler. EPO Application No. 447,066 discloses a rubber composition for a tire tread composed of silica and silane coupling agent with rubbers composed of polybutadiene or styrene/butadiene copolymer prepared with an organic alkali metal initiator and which may also contain other specified rubbers.

The term "phr" as used herein, and according to conventional practice, refers to "parts of a respective material per 100 parts by weight of rubber".

The terms such as "compounded rubber", "rubber compound" and "rubber composition" relate generally to rubber which has been mixed with various rubber compounding ingredients. Such terms are well known to those skilled in the rubber mixing art, especially for tires.

The terms "vulcanized", "vulcanize", "cured" and "cure", if used herein, are used interchangeably to refer to the vulcanization of rubber and such terms are well known to those having a skill in the rubber vulcanization art.

SUMMARY AND PRACTICE OF THE INVENTION

In accordance with this invention, a pneumatic tire is provided having a tread comprised of, based on 100 parts by weight rubber, (A) elastomers composed of (i) about 15 to about 40, alternatively preferably about 15 to about 25 phr of solution polymerization prepared styrene/butadiene copolymer rubber, (ii) about 85 to about 60, alternatively about 85 to about 75 phr of two diene-based elastomers consisting essentially of (a) about 10 to about 30, alternatively about 15 to about 25, phr cis 1,4-polybutadiene rubber, and (b) about 30 to about 60, alternatively about 40 to about 60, phr of high vinyl polybutadiene rubber having a vinyl content in a range of about 50 to about 90, alternatively about 55 to about 75, weight percent, (B) about 55 to about 90, alternatively about 60 to about 85, phr particulate, preferably precipitated, silica, (C) at least one silica coupler having a silane moiety reactive with the surface of said silica and a sulfur moiety interactive with said elastomer, in a weight ratio of silica to coupler of about 7/1 to about 15/1, and (D) about 0 to about 50, alternatively about 5 to about 25, phr carbon black, wherein the weight ratio of silica to carbon black, if carbon black is used, is at least 2/1, alternatively at least 4/1 and often preferably at least 10/1 and where the total of silica and carbon black, if used, is about 40 to about 110, alternatively about 60 to about 90 phr.

In one aspect of the invention, the basic three rubber elastomers for the silica reinforced tire tread rubber can also contain about 5 to about 20 phr of cis-1,4 polyisoprene natural rubber.

In a further aspect of the invention, the basic three rubber elastomers, whether or not containing the said optional additional natural rubber can also contain a total of about 5 to about 20 phr of at least one elastomer selected from 3,4-polyisoprene rubber, isoprene/butadiene copolymer elastomer, styrene/isoprene copolymer elastomer, emulsion polymerization prepared styrene/butadiene copolymer rubber, styrene/isoprene/butadiene terpolymer elastomer and medium vinyl polybutadiene rubber containing about 40 to about 50 percent vinyl content.

The rubber blends containing the aforesaid high silica loading, including the silica coupler, in combination with the defined rubbers, which is required to include the high vinyl polybutadiene rubbers, is an important feature of the invention designed to enhance properties of a tire tread containing a substantial amount of silica reinforcement.

In one aspect, the high vinyl (HVBD) polybutadiene rubber is considered herein to be beneficial for considerably promoting treadwear and rolling resistance without significant loss of traction.

The high vinyl polybutadiene can optionally be oil extended before mixing with various rubber compounding materials for ease of processing. If oil extension is used, usually about 15 to about 35 phr of rubber processing oil is used, usually of the aromatic or aromatic/paraffinic oil type, to provide a ML-4 (100° C.) viscosity for the elastomer in a range of about 40 to about 80.

As hereinbefore pointed out, a minor amount of medium vinyl polybutadiene rubber can be added to the basic elastomer composition. Such medium vinyl polybutadiene can be suitably produced by various processes, such as those already known in the art.

However, it is considered herein that sometimes a particular type of medium vinyl polybutadiene be used. Such medium vinyl polybutadiene may be of the type prepared by polymerizing 1,3-butadiene with a very small amount of divinylbenzene in an essentially polar aromatic solvent with an alkyl lithium catalyst and at least one polar catalyst modifier as described in U.S. Pat. No. 4,230,841 which is incorporated herein by reference.

The cis 1,4-polybutadiene rubber is considered herein to be beneficial to enhance the tire tread's wear, or treadwear.

Such cis 1,4-polybutadiene rubber can be prepared, for example, by organic solution polymerization of 1,3-butadiene.

The cis 1,4-polybutadiene rubber may be conventionally characterized, for example, by having at least a 90% cis 1,4-content.

The cis 1,4-polyisoprene natural rubber is well known to those having skill in the rubber art.

The solution polymerization prepared styrene/butadiene copolymer can be suitably prepared by copolymerization of styrene and 1,3-butadiene in an organic solvent solution in the presence of a suitable catalyst. A preparation of such styrene/butadiene copolymer elastomer is well known to those having a skill in such art.

The emulsion prepared styrene/butadiene copolymer can be suitably prepared by copolymerizing styrene and 1,3-butadiene in an aqueous polymerization medium together with suitable catalyst and emulsifier(s). A preparation of such styrene/butadiene copolymer elastomer is well known to those skilled in such art.

It is understood herein that it is well known to those having skill in such representative art that solution polymerization prepared styrene/butadiene copolymer elastomers and emulsion polymerization prepared styrene/butadiene copolymer elastomers have different properties for various elastomer applications. For this application, solution polymerization prepared styrene/butadiene copolymers are preferred.

In the practice of this invention, a balanced rubber blend of solution polymerization prepared styrene/butadiene copolymer elastomer together with at least two butadiene based rubbers, namely cis 1,4-polybutadiene rubber and high vinyl polybutadiene rubber is provided which relies upon quantitative silica reinforcement which, in turn, relies on a silica coupler for the silica's reinforcing effect for the rubber blend.

In another aspect, when such sulfur vulcanized rubber tread also may contain carbon black in a weight ratio of silica to carbon black of at least about 2/1, preferably at least about 4/1 and for some applications at least 10/1.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The BET surface area of the silica, as measured using nitrogen gas, is preferably in the range of about 100 to about 250, preferably about 120 to about 200, square meters per gram. The BET method of measuring surface area is described in the *Journal of the American Chemical Society*, Volume 60, page 304 (1930).

The silica also typically has a dibutylphthalate (DBP) absorption value in a range of about 100 to about 400, and usually about 150 to about 300.

Various commercially available silicas may be considered for use in this invention such as, for example only and without limitation, silicas commercially available from PPG Industries under the Hi-Sil trademark with designations 210, 243, etc; silicas available from Rhone-Poulenc, with designation of Zeosil 1165MP, silicas available from Degussa AG with designations VN2 and VN3, and BV3370GR and from J. M. Huber as, for example, Zeopol 8745.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.5 being sometimes preferred.

Accelerators are used to control the time and/or temperature required for vulcanization and to improve the properties of the vulcanizate. Retarders are also used to control the rate of vulcanization. In one embodiment, a single accelerator system may be used, i.e., primary accelerator. Conventionally and preferably, a primary accelerator(s) is used in total amounts ranging from about 0.5 to about 4, alternatively about 1.2 to about 2.0, phr. In another embodiment, combinations of a primary and secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to the utilization of specified blends of rubbers in tire treads, in combination with silica and silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

A rubber composition (compounded rubber) can be prepared of a blend of solution polymerization prepared styrene/butadiene copolymer rubber together with cis 1,4-polybutadiene rubber and high vinyl polybutadiene and referred to herein as Sample B.

A control rubber composition can be composed of solution polymerization prepared styrene/butadiene copolymer rubber, cis 1,4-polybutadiene rubber, isoprene/butadiene copolymer rubber and cis 1,4-polyisoprene rubber was prepared and identified herein as Sample A.

The rubber compositions can be prepared by mixing the ingredients in several stages, namely, four sequential non-productive stages (without the curatives) and a final productive stage (basically for the curatives), then the resulting composition cured under conditions of elevated temperature and pressure.

For the non-productive mixing stages, exclusive of the accelerator(s), sulfur curatives zinc oxide and antioxidant can be mixed (added) in the final, productive mixing stage, for Sample A all of the ingredients can be added in the first non-productive stage except for about 20 to about 50 percent of the reinforcing fillers (silica or carbon black), with proportional amounts (to the reinforcing fillers) of coupler and processing oil, which can be added in the second non-productive mixing stage and, for Sample B, all of the non-productive ingredients can be added in the first mixing stage.

The ingredients can be mixed in each of the non-productive mixing stages for about five minutes to a temperature of about 165° C., except for the fourth mixing stage which can be mixed for about three minutes to a temperature of about 145° C., all in a Banbury type of mixer. To the resulting rubber composition (mixture) can then be added, in the productive mixing stage, the remaining ingredients in a Banbury type mixer for about two minutes to a temperature of about 110° C. The rubber can then be vulcanized at a temperature of about 150° C. for about 18 minutes.

The rubber compositions may be comprised of the ingredients illustrated in Table 1.

TABLE 1

| Sample # | A | B |
|---|---|---|
| Non-Productive Mix Stages | | |
| S-SBR[1] | 25 | 20 |
| Cis 1,4-polybutadiene[2] | 20 | 20 |
| HVBD[3] | 0 | 50 |
| NR (polyisoprene)[4] | 10 | 10 |
| IBR[5] | 45 | 0 |
| Processing oil, aromatic | 14 | 0 |
| Processing oil, paraffinic | 0 | 9 |
| Fatty acid | 3 | 3 |
| Silica[6] | 85 | 76 |
| Plasticizers, resins and waxes | 1.5 | 1.5 |
| Coupling agent[7] | 13.3 | 12 |
| Zinc oxide | 2.5 | 2.5 |
| Antidegradant[8] | 2 | 2 |
| Productive Mix Stage | | |
| Antidegradant[9] | 1 | 1 |
| Sulfur | 1.5 | 1.6 |
| Sulfenamide and diphenyl guanidine type accelerator(s) | 3.7 | 3.8 |

[1]A solution polymerization prepared styrene/butadiene copolymer rubber having about 10 percent bound styrene, a Tg of about −42° C., obtainable from The Goodyear Tire & Rubber Company.
[2]Cis 1,4-polybutadiene rubber having a cis 1,4-content of about 96 percent obtainable as Budene ® 1207 from The Goodyear Tire & Rubber Company.
[3]A high vinyl polybutadiene rubber having a vinyl content of about 65 weight percent and a cis 1,4-content of about 16 percent obtainable from The Goodyear Tire & Rubber Company.
[4]Cis 1,4-polyisoprene natural rubber.
[5]An isoprene/butadiene copolymer elastomer having an isoprene content of about 50% and a Tg of about −44° C. obtainable from The Goodyear Tire & Rubber Company.
[6]A silica obtainable as Zeopol 8745 from the J. M. Huber Company.
[7]Obtainable as bis-3-triethoxysilylpropyl) tetrasulfide (50% active) commercially available as X50S from Degussa as a 50/50 blend of the tetrasulfide with N330 carbon black (thus, considered 50% active).
[8&9]Of the diarylparaphenylene diamine and dihydrotrimethylquinoline type, respectively.

Properties of the rubber compositions are expected herein to be predictive of good tire tread rolling resistance and treadwear for the Sample B which represents a tread composition of this invention as compared to Sample A.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread comprised of, based on 100 parts by weight rubber, (A) elastomers composed of solution polymerization prepared styrene/butadiene copolymer rubber (S-SBR), cis 1,4-polybutadiene rubber and high vinyl polybutadiene rubber having a vinyl content in a range of about 55 to about 90 percent; (B) about 55 to about 90 phr silica consisting of precipitated silica; (C) at least one silica coupler having a silane moiety reactive with the surface of the silica and another moiety comprised of a sulfur moiety interactive with said elastomer, in a weight ratio of silica to coupler of about 7/1 to about 15/1; wherein said elastomers consist of:
(i) about 15 to about 40 phr of S-SBR, about 10 to about 30 phr of cis 1,4-polybutadiene rubber and about 30 to about 60 phr of said high vinyl butadiene rubber, or
(ii) about 15 to about 40 phr of S-SBR, about 10 to about 30 phr of cis 1,4-polybutadiene rubber, about 30 to about 60 phr of said high vinyl polybutadiene rubber and about 5 to about 20 phr of cis 1,4-polyisoprene natural rubber, or
(iii) about 15 to about 40 phr of S-SBR, about 10 to about 30 phr of cis 1,4-polybutadiene rubber, about 30 to about 60 phr of said high vinyl polybutadiene rubber and about 5 to about 20 phr of at least one elastomer selected from cis 1,4-polyisoprene natural rubber, 3,4-polyisoprene rubber, isoprene/butadiene copolymer elastomer, styrene/isoprene copolymer elastomer, solution polymerization prepared styrene/butadiene copolymer rubber and medium vinyl polybutadiene rubber containing about 40 to about 50 percent vinyl content.

2. The tire of claim 1 where said tread also contains about 5 to about 25 phr of carbon black; the weight ratio of precipitated silica to carbon black is at least about 2/1 and the total of such silica and carbon black is in a range of about 60 to about 110 phr.

3. The tire of claim 1 wherein said elastomers consist of about 15 to about 40 phr of S-SBR, about 10 to about 30 phr of cis 1,4-polybutadiene rubber and about 30 to about 60 phr of said high vinyl butadiene rubber.

4. The tire of claim 3 where said tread also contains about 5 to about 25 phr of carbon black; the weight ratio of precipitated silica to carbon black is at least about 2/1 and the total of such silica and carbon black is in a range of about 60 to about 110 phr.

5. The tire of claim 1 wherein the elastomers consist of about 15 to about 40 phr of S-SBR, about 10 to about 30 phr of cis 1,4-polybutadiene rubber, about 30 to about 60 phr of said high vinyl polybutadiene rubber and about 5 to about 20 phr of cis 1,4-polyisoprene natural rubber.

6. The tire of claim 5 where said tread also contains about 5 to about 25 phr of carbon black; the weight ratio of precipitated silica to carbon black is at least about 2/1 and the total of such silica and carbon black is in a range of about 60 to about 110 phr.

7. The tire of claim 6 where the weight ratio of precipitated silica to carbon black is at least 10/1.

8. The tire of claim 6 where the said coupler is a bis-3-(triethoxysilylpropyl) tetrasulfide.

9. The tire of claim 1 wherein the elastomers consist of about 15 to about 40 phr of S-SBR, about 10 to about 30 phr of cis 1,4-polybutadiene rubber, about 30 to about 60 phr of said high vinyl polybutadiene rubber and about 5 to about 20 phr of at least one elastomer selected from cis 1,4-polyisoprene natural rubber, 3,4-polyisoprene rubber, isoprene/butadiene copolymer elastomer, styrene/isoprene copolymer elastomer, solution polymerization prepared styrene/butadiene copolymer rubber and medium vinyl polybutadiene rubber containing about 40 to about 50 percent vinyl content.

10. The tire of claim 9 where said tread also contains about 5 to about 25 phr of carbon black; the weight ratio of precipitated silica to carbon black is at least about 2/1 and the total of such silica and carbon black is in a range of about 60 to about 110 phr.

11. The tire of claim 10 where the weight ratio of silica to carbon black is at least 10/1.

12. The tire of claim 10 where the said coupler is a bis-3-(triethoxysulylpropyl) tetrasulfide.

13. The tire of claim 2 where said silica is characterized by having a BET surface area in a range of about 100 to about 250 and a DBP absorption value in a range of about 100 to about 400.

14. The tire of claim 2 where the weight ratio of silica to carbon black is at least 10/1.

15. The tire of claim 1 where the said coupler is a bis-3-(triethoxysilylpropyl)tetrasulfide.

16. The tire of claim 4 where the weight ratio of silica to carbon black is at least 10/1.

17. The tire of claim 4 where the said coupler is a bis-3-(triethoxysilylpropyl)tetrasulfide.

* * * * *